United States Patent [19]
Fingleson et al.

[11] Patent Number: 5,479,661
[45] Date of Patent: Jan. 2, 1996

[54] GARMENT HAVING PRINTED INSTRUCTIONS FOR SELF-EXAMINATION OF THE BREASTS

[76] Inventors: Linda J. Fingleson; Lisa A. Richman, both of 26540 Agoura Rd., #218, Calabasas, Calif. 91302

[21] Appl. No.: 368,014

[22] Filed: Jan. 3, 1995

[51] Int. Cl.⁶ .............................. G09B 23/28; A41D 1/00
[52] U.S. Cl. .................. 2/69; 2/73; 450/1; 434/257; 434/262; 434/267
[58] Field of Search ............................ 2/46, 47, 48, 49.1, 2/49.2, 49.3, 49.4, 49.5, 50, 51, 52, 104, 105, 106, 69, 69.5, 114, 115, 113, 109, 110, 73, 102; 450/1, 79, 18, 23; 604/345; 434/257, 258, 248, 262, 267, 112, 272, 430

[56] References Cited

U.S. PATENT DOCUMENTS

| | | | |
|---|---|---|---|
| 1,415,655 | 5/1922 | Kops | 450/79 |
| 4,530,349 | 7/1985 | Metzger | 434/262 X |
| 4,561,851 | 12/1985 | Ferreura et al. | 434/272 |
| 4,847,916 | 7/1989 | Winston | 2/115 X |
| 4,912,780 | 4/1990 | Falack | 2/102 |
| 5,121,505 | 6/1992 | Ludmer et al. | |
| 5,207,582 | 5/1993 | Michelson | |
| 5,275,818 | 1/1994 | Kind | 2/115 X |
| 5,282,749 | 2/1994 | Ketch | 434/258 X |

FOREIGN PATENT DOCUMENTS 2205675  12/1988  United Kingdom .................. 434/267

OTHER PUBLICATIONS

The Anatonical Products Catalog, "F. Flip Chart tells Breast Care Story", p. 151, 1991–92 Edition USA Today, Phase Translations and Travelers to a T. Thursday, Jun. 11, 1992.

*Primary Examiner*—Jeanette E. Chapman

[57] ABSTRACT

An instructional upper body garment wearable by a woman and having printed instructions thereon for self-examination of the breasts for detection of cancer or tumors. The garment includes two rectangular panels affixed at the shoulders, having a central neck opening and open sides. Ties are provided for releasable connection of a portion of the sides of the panels during use. The printed instructions and graphics are positioned upside-down on the front panel so the wearer can read them while wearing the garment. The open sides of the panels allow the woman to access her breasts during the examination, yet the garment also provides sufficient privacy.

3 Claims, 8 Drawing Sheets

5,479,661

GARMENT HAVING PRINTED INSTRUCTIONS FOR SELF-EXAMINATION OF THE BREASTS

BACKGROUND OF THE INVENTION

This application in-part discloses and claims material disclosed in our pending U.S. patent application Ser. No. 014,200 filed Oct. 15, 1993 to which is claimed benefit to the earlier filing date for common material.

1. Field of the Invention

This invention is related to instructional teaching materials directed towards detection of breast cancer in women, and more precisely to a garment having printed instructions thereon wearable by a woman for self-examination of the breasts.

2. Background of the Invention

The primary procedures used in the detection of breast cancer which are most widely available today are physical examination and mammography. The earlier the cancer is detected the better the chances of successful treatment and recovery. Most of the early detections of tumors are diagnosed by the women themselves with self-examinations, and confirmed by physicians. Therefore early detection of cancer greatly increases the effectiveness of the treatment. Proper instruction of women on the correct procedure of self-examination of the breasts can increase their chances of early detection.

There exists a wide variety of material available on instructing women on self-examination of the breasts for the detection of breast cancer according to medical industry specifications, but this material is almost exclusively provided in the form of printed documents, or audio or video tapes. Hands on experience is most effective during instruction, however this may be inconvenient for the woman while listening or viewing the tapes, especially if there are others present.

One prior art device which provides instruction for breast self-examination includes a breast self-examination facilitator patented by Michelson on May 4, 1993, U.S. Pat. No. 5,207,582. Michelson's facilitator includes an information panel which can be affixed to an interior wall of a shower or bath, with printed instructions on self-examination and charts for recording information by the user on the panel. While the Michelson device provides written instruction it does not provide the information on a wearable garment.

One prior art device which does provide written information on a wearable garment is shown in a tourist map construction in combination with an article of clothing. This device was patented on Jun. 16, 1992, by Ludmer et al, U.S. Pat. No. 5,121,505. Ludmer et al provides T-shirts having maps of specific areas such as tourist sites or amusement parks printed upside-down on the front of the shirt so the wearer can look down and read the map. While Ludmer et al provides a wearable garment with printed information, the information is not directed toward breast self-examination, and the Ludmer garment is not suitable for a woman to wear while conducting the examination, since breast self-examinations must be done on the skin and not through clothing.

Therefore, there is a need for a wearable device which helps instruct women in the proper hands on procedure of breast self-examination, for the purpose of early detection of cancer, and also provides for the women's privacy during the procedure.

SUMMARY OF THE INVENTION

The present invention provides an upper body garment having open sides with ties, with the front panel of the garment printed with written and graphic instructions for breast self-examination which the woman can view while wearing the garment. The garment is worn by a woman while learning how to perform a self-examination of her breasts, to detect lumps or other abnormalities in her breasts which she might feel with her hands and which might indicate a serious medical condition. The graphic instructions include illustrations of two hands, showing which hand to use on which breast, and further includes written instructions for hand motions during the examination. All instructions are written upside-down, so that the woman can look downward while wearing the garment and read the instructions. The printed instructions additionally include hand movement arrows indicating proper movements of the hands, and beginning and starting locations for the hands during the examination. The graphic illustrations on the garment have a center alignment point which is to be centered over the breast so the hand movements can be performed under the garment on the correct location of the breast while the woman is reading the instruction. The sides of the garment are left open so the woman can easily reach through to examine her breasts, yet the garment also covers enough of the woman to provide sufficient privacy. The instructions can be provided in various languages and the garments can be provided in reusable, washable fabrics, plastic materials or in disposable units.

Other objects and advantages of the present invention may be more clearly understood by reviewing the remaining description while making reference to the appended drawings and claims.

DESCRIPTION OF THE PREFERRED EMBODIMENTS

Figure 1:
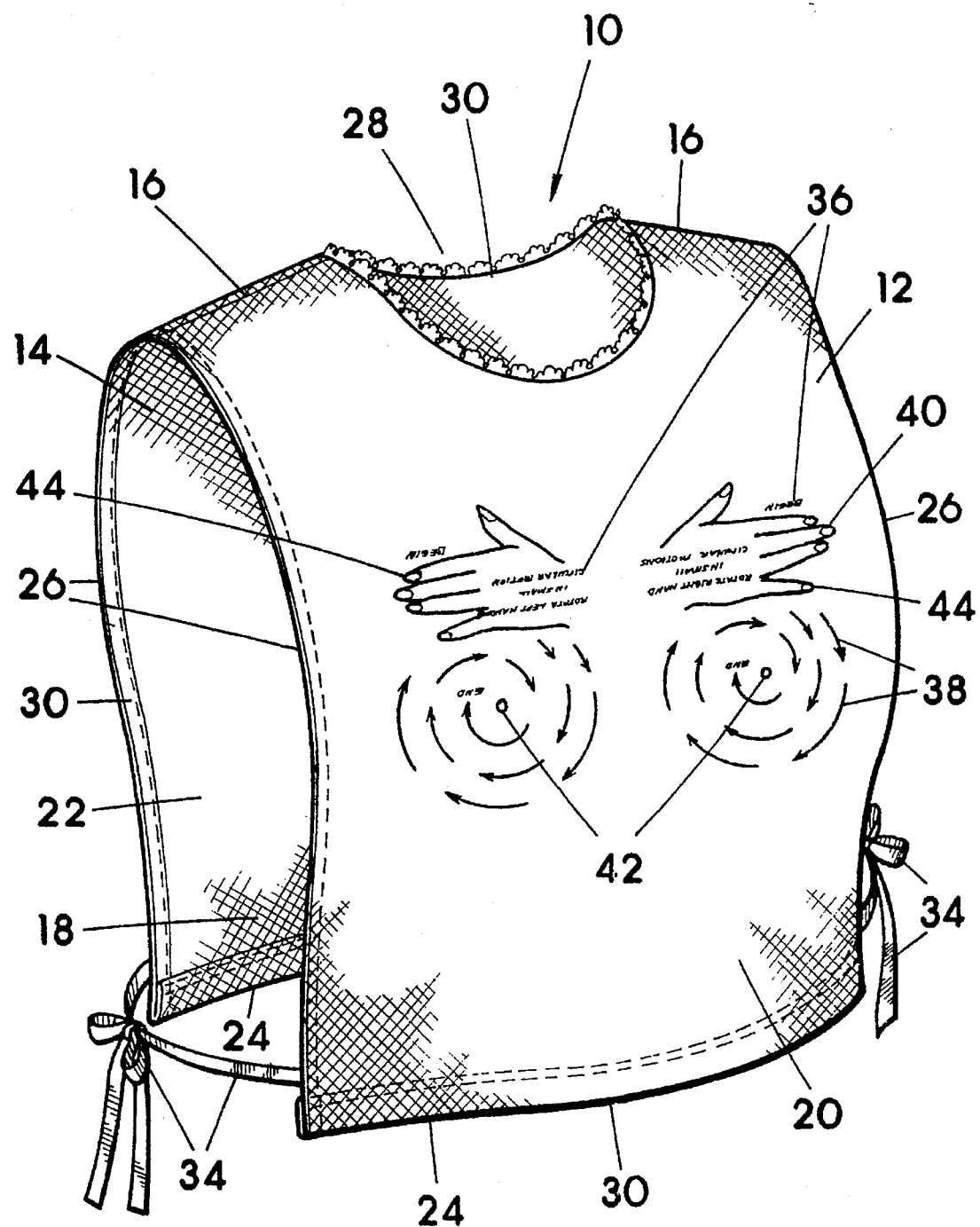
FIG. 1 is a front perspective view of an instructional garment in accordance with the invention and showing the open sides and an example of printed information on the front panel.
Figure 2:
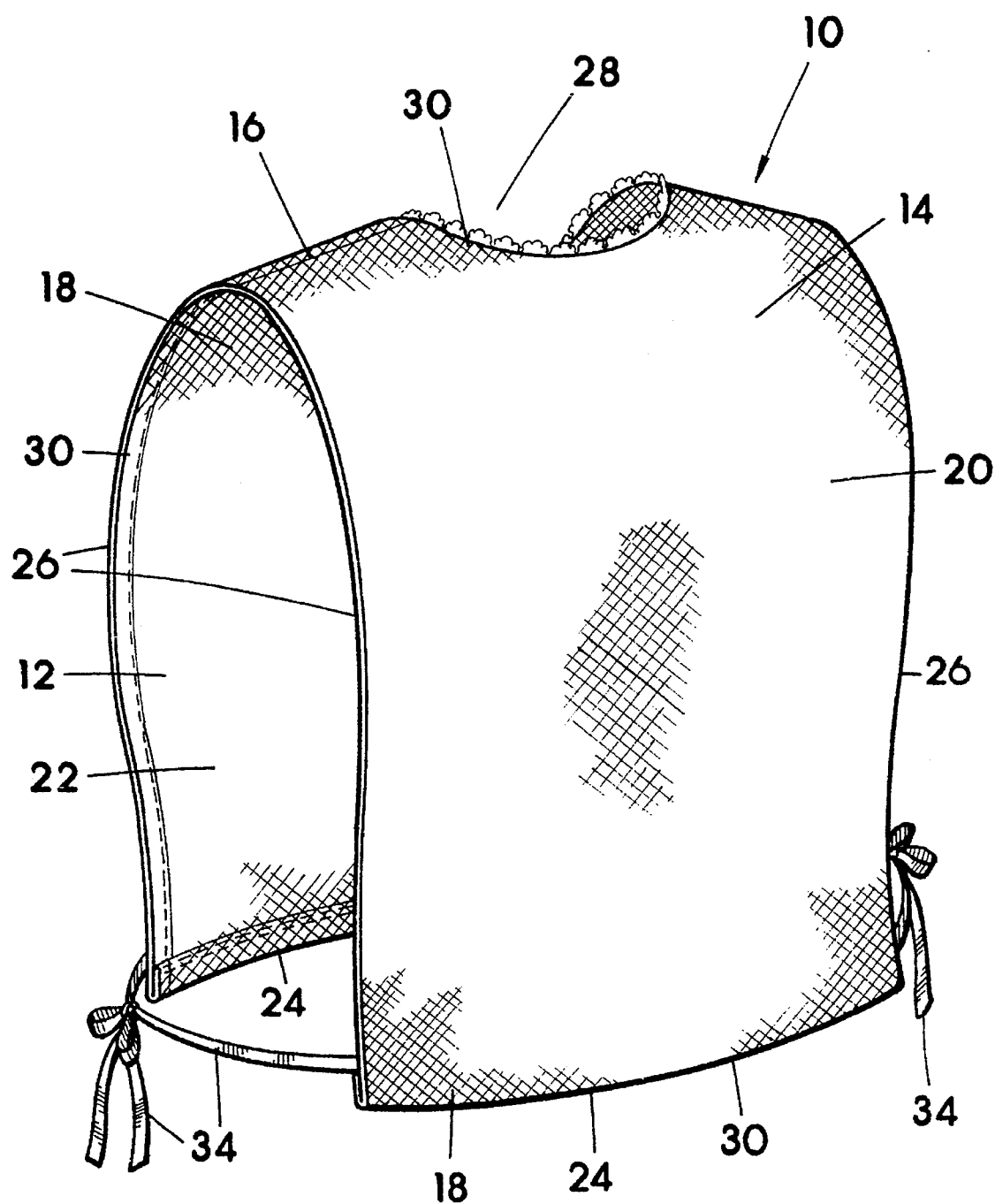
FIG. 2 is a rear perspective view of the garment of FIG. 1.

Referring now to the drawings in which like numerals indicate like elements throughout the various views of the instructional garment 10. Garment 10 includes a rectangular front panel 12 and a rectangular back panel 14 both connected at two shoulder seams 16 using conventional seaming practices such as sewing, adhesives, or heat bonding and the like. Garment 10 is preferably manufactured of a soft, flexible woven fabric 18 which is machine washable, but garment 10 can also be made of a plastic or paper material which may or may not be disposable. Garment 10 includes an outer surface 20 and interior surface 22, a lower bottom edge 24 and four sides 26, two of which are on front panel 12 and oppositely disposed from one another, and two on back panel 14 and oppositely disposed from one another, which are left unaffixed to one another. Garment 10 also includes a neck opening 28 for passage of the wearer's head which is preferably finished with a small hem 30. The sides 26, which are terminal side edges of both panels 12 and 14, are also finished with a hem 30 as are the bottom edges 24 of both panels 12 and 14. Affixed along the lower edges of sides 26 of both the front and back panels 12 and 14 are ties 34, which are basically elongated sections of ribbon or material used to temporarily connect a portion of the right front panel 12 to the right back panel 14 and the left front panel 12 to the left back panel 14. When the side panels 26 are affixed by ties 34 there are large side openings created which are best shown in FIGS. 1 and 2 being positioned between front panel 12, back panel 14 and above ties 34. The side openings above ties 34 are large enough and positioned properly to allow the insertion of a hand through the opening to contact the breast. The mode of releasable attachment of the sides 26 of the garment 10 can also include affixed snaps, clips, belts, or hook and loop type fasteners or actually any releasable attachment which may be suitable for the specific material of which garment 10 is manufactured. The attachment of a portion of sides 26 helps to maintain a measure of privacy for the wearer and helps keep garment 10 in place while in use. Garment 10 covers the back and front chest of the user with the bottom edge 24 extending to or just below the waist.

Figure 3:
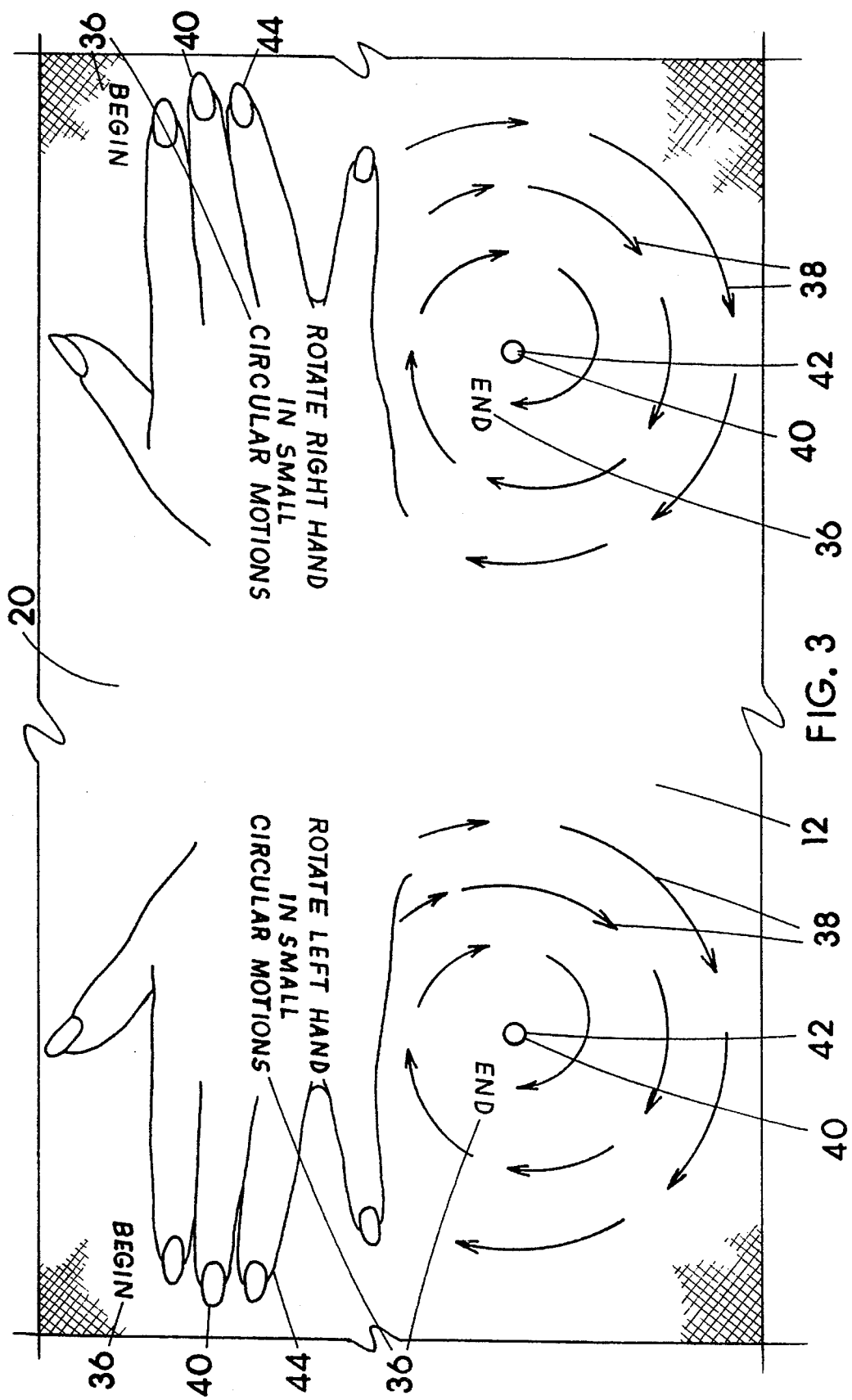
FIG. 3 is an enlargement of the instructional graphics illustration of FIG. 1.
Figure 4:
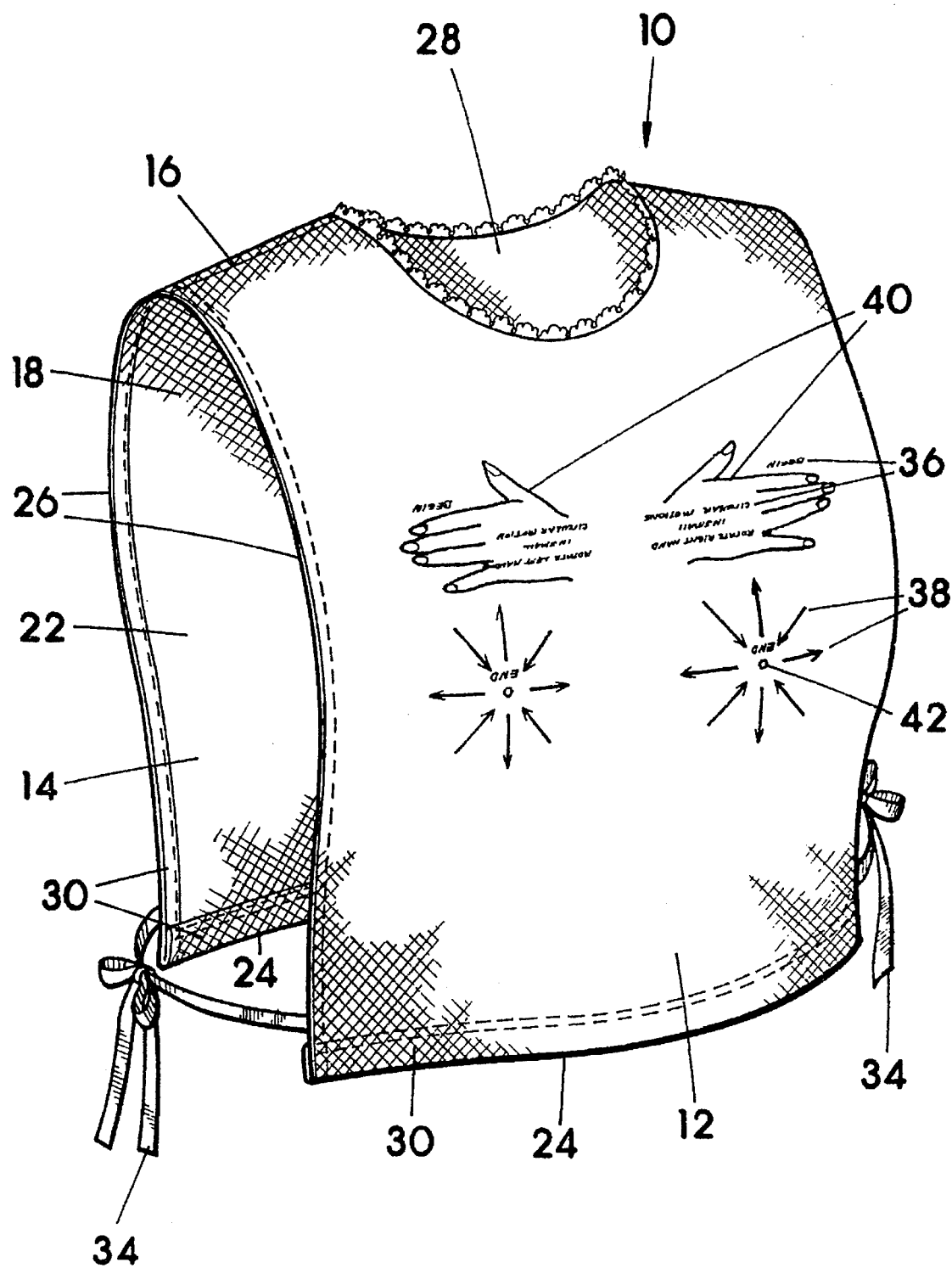
FIG. 4 is a front perspective view of an instructional garment in accordance with the present invention showing a second example of instructional graphics.
Figure 5:
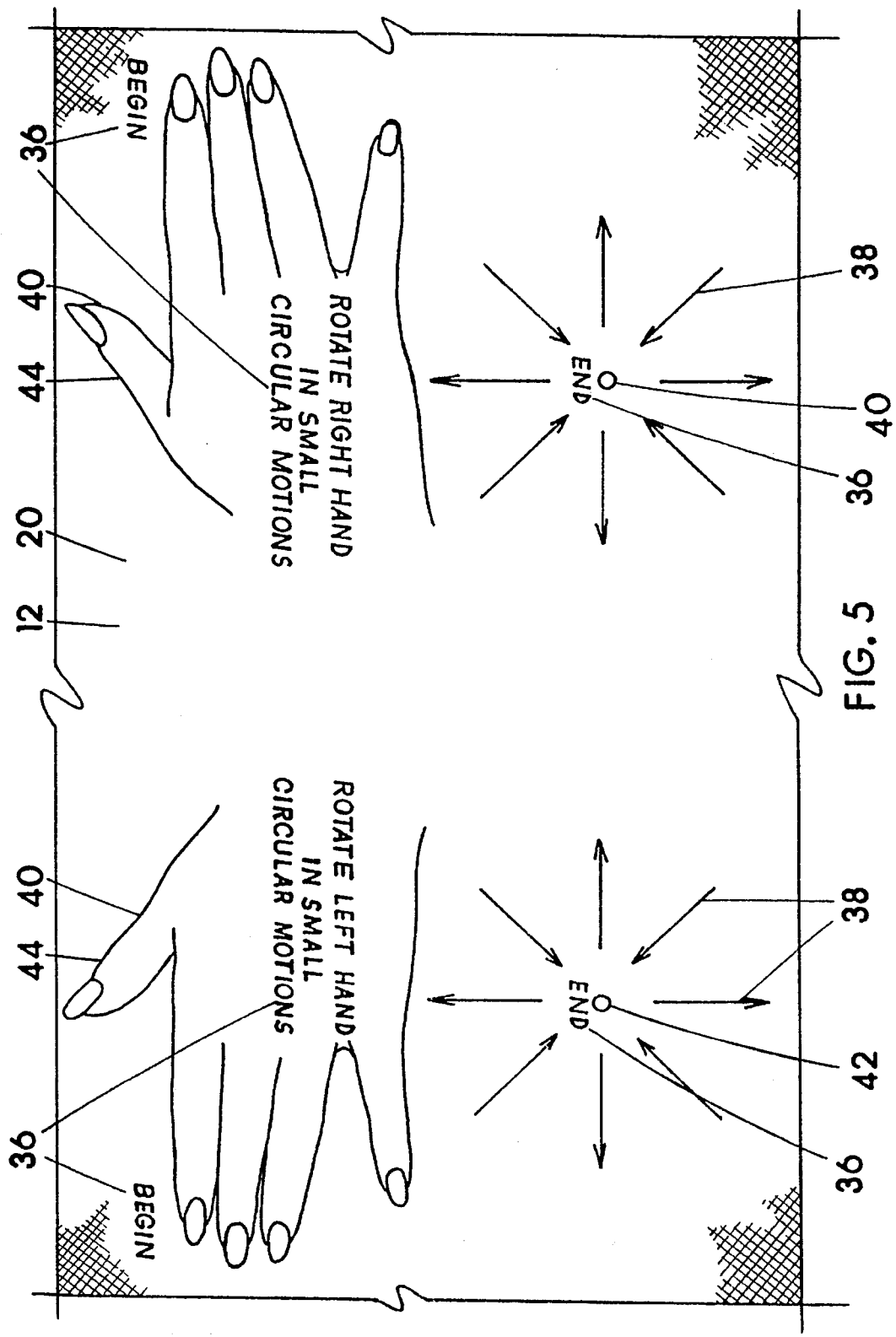
FIG. 5 is an enlargement of the instructional graphics of FIG. 4.
Figure 6:
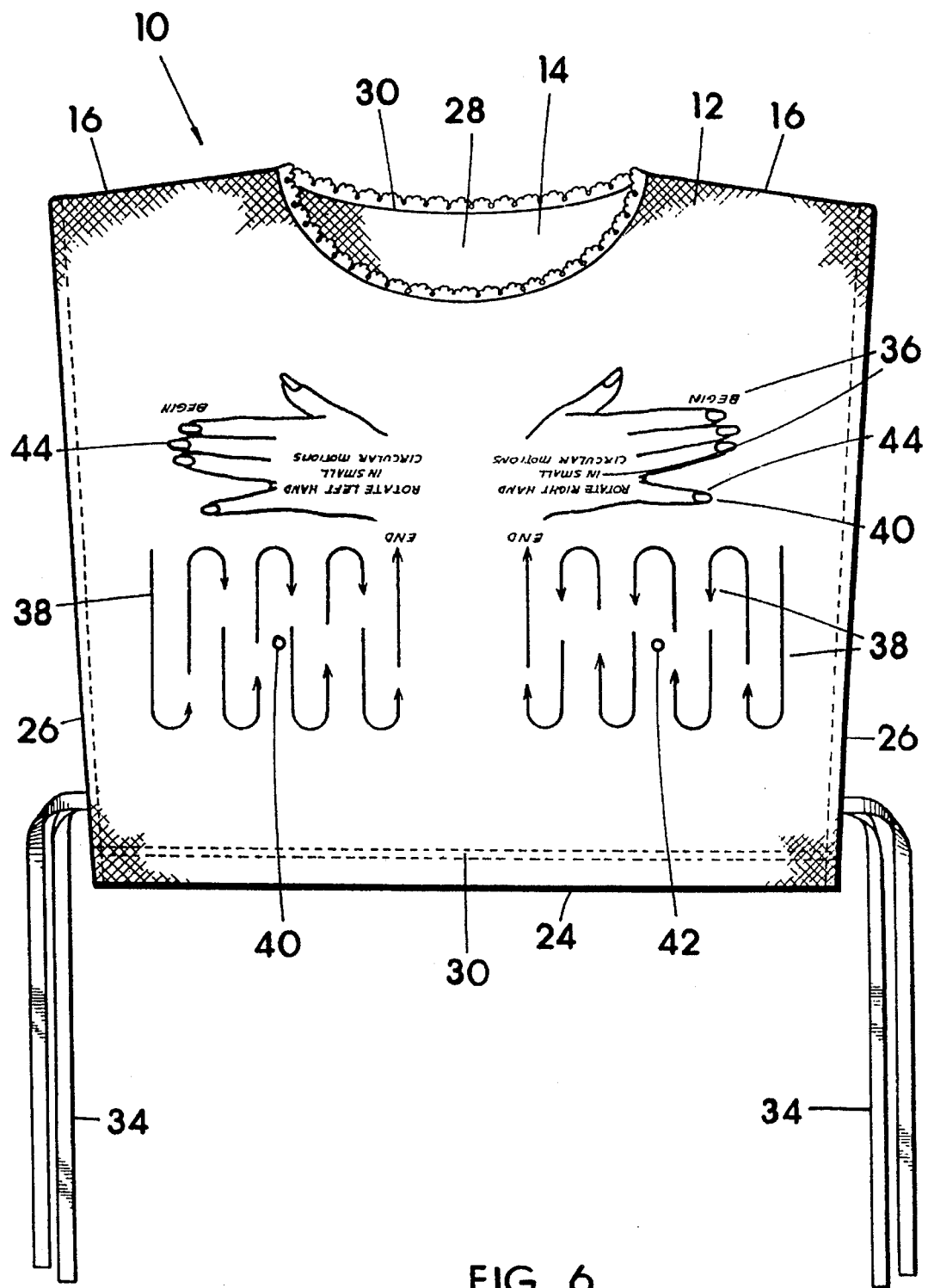
FIG. 6 is a frontal view of an instructional garment in accordance with the present invention showing a third example of instructional graphics.
Figure 7:
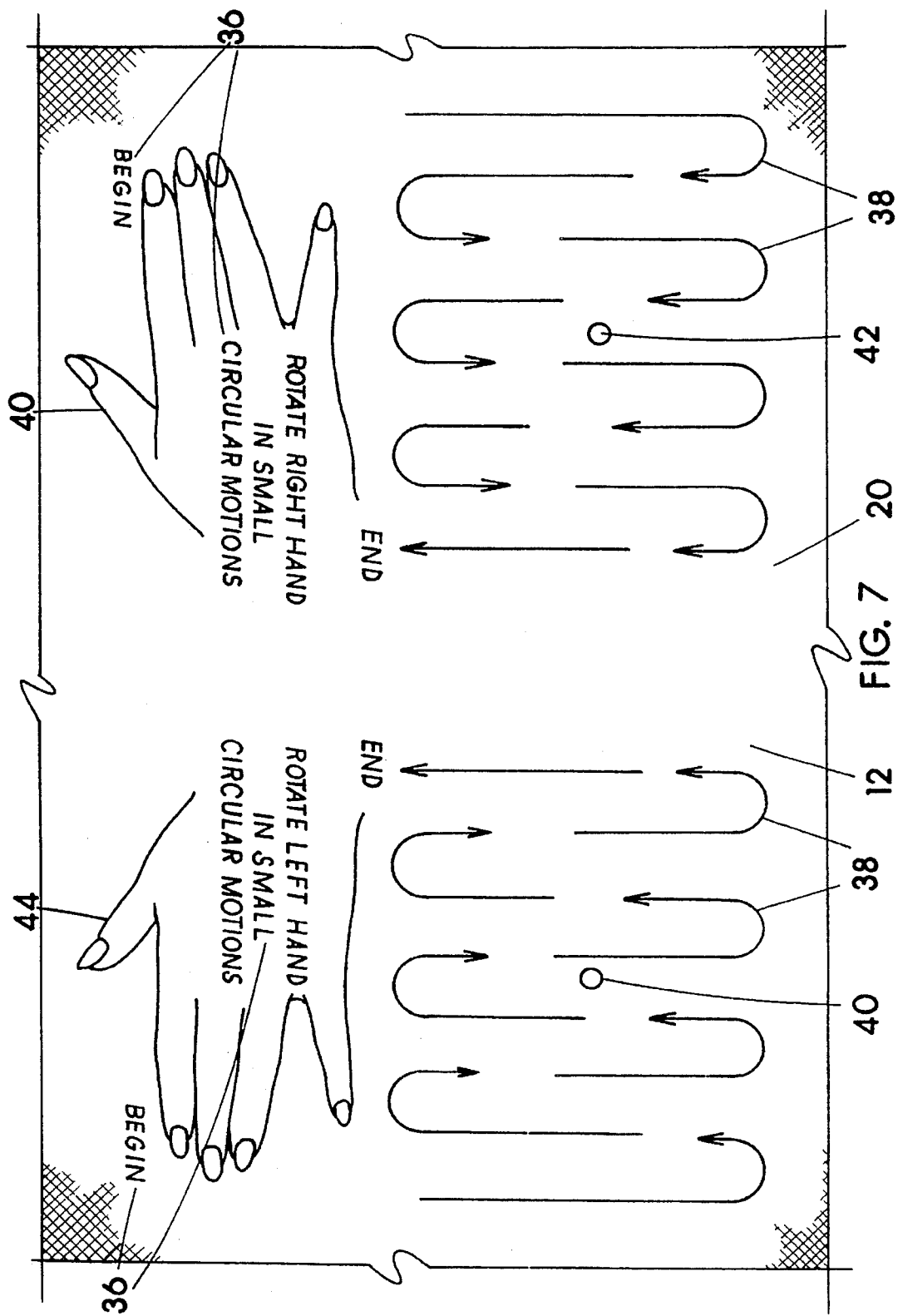
FIG. 7 is an enlargement of the instructional graphics of FIG. 6.

The outer surface 20 of the front panel 12 displays written or printed instructions 36, including upside-down words, directional indicators or arrows 38 and various graphic illustrations 40 which instruct the wearer how to perform breast self-examinations. The instructions 36, graphic illustrations 40 and arrows 38 can be printed on the outer surface 20 of front panel 12 using various techniques of printing, paint, embroidery or the like. A center point 42 is provided which indicates alignment points for positioning of the graphic illustrations 40 centrally over each breast. The graphic illustrations 40 of the preferred embodiment also depict the back surface of two out stretched hands 44; a left hand 44 over the upper right breast area and a right hand 44 over the upper left breast area. The depiction of the hands 44 is to instruct the wearer to use her hands to accomplish the procedure, since some women may not be able to see or read well, or read that particular language. There are directional indicators or arrows 38 which direct the user's hand 44 to follow a specific direction and pattern over the represented breast area. The directional arrows 38 can form a spiral, shown in the drawings in FIGS. 1 and 3 as beginning near the wrist area of the hands 44. The arrows 38 spiral around in a clockwise direction and terminate at a center point 42, which typically represents the woman's nipple. The directional arrows 38 can also form a radial pattern going from the center point 42 outward and then back in to the center point 42 again, with this pattern repeated in a clockwise rotation, as shown in FIGS. 4 and 5. The directional arrows 38 can also form an up and down pattern beginning adjacent the sides 26 of the front panel 12 and ending towards the middle, as illustrated in FIGS. 6 and 7. Other patterns or combinations of the previously mentioned patterns may also be provided for arrows 38.

There are printed instructions 36 on the outer surface 20 of panel 12 which inform the user the location of the beginning of the procedure using the hands 44. Printed instructions 36 also inform the wearer of the type of movement used with the hands 44, such as small circular motions to be used with the larger overall movement directed by the arrows 38, and the area where the procedure ends. The printed instructions 36 can vary, with the main purpose to instruct the wearer in the correct use of the graphic illustrations 40 and directional arrows 38.

To use the instructional garment 10 the wearer first removes all upper body clothing and places garment 10 on, passing her head through neck opening 28 and arms through the open sides 26. Ties 34 are then secured on the sides 26 of panels 12 and 14, as shown in the drawings. The ties 34 would be roughly positioned at the wearer's waist in use. The wearer then aligns the center point 42 over each nipple and follows the printed instructions 36 and directional arrows 38 as indicated on the front panel 12. The wearer passes her hand through the side openings of garment 10 under front panel 12 to complete the procedure. While it is not necessary, it is preferred that the wearer also be accompanied by a knowledgeable or accredited person who can answer questions if necessary.

Although not shown in the drawings, garment 10 can be provided in one single rectangular panel having a central neck opening 28 and ties 34, with shoulder seams 16 eliminated. Furthermore, garment 10 can also be provided in one front panel 12 which is structured to be removably attached to the wearer at the shoulders with some type of non-toxic releasable adhesive strip or possibly a strap connectable behind the neck. The adhesive strip can be covered with a protective paper strip until ready for use. However, a front and back panel 12 and 14 are preferred since it provides the wearer with more privacy.

Figure 8:
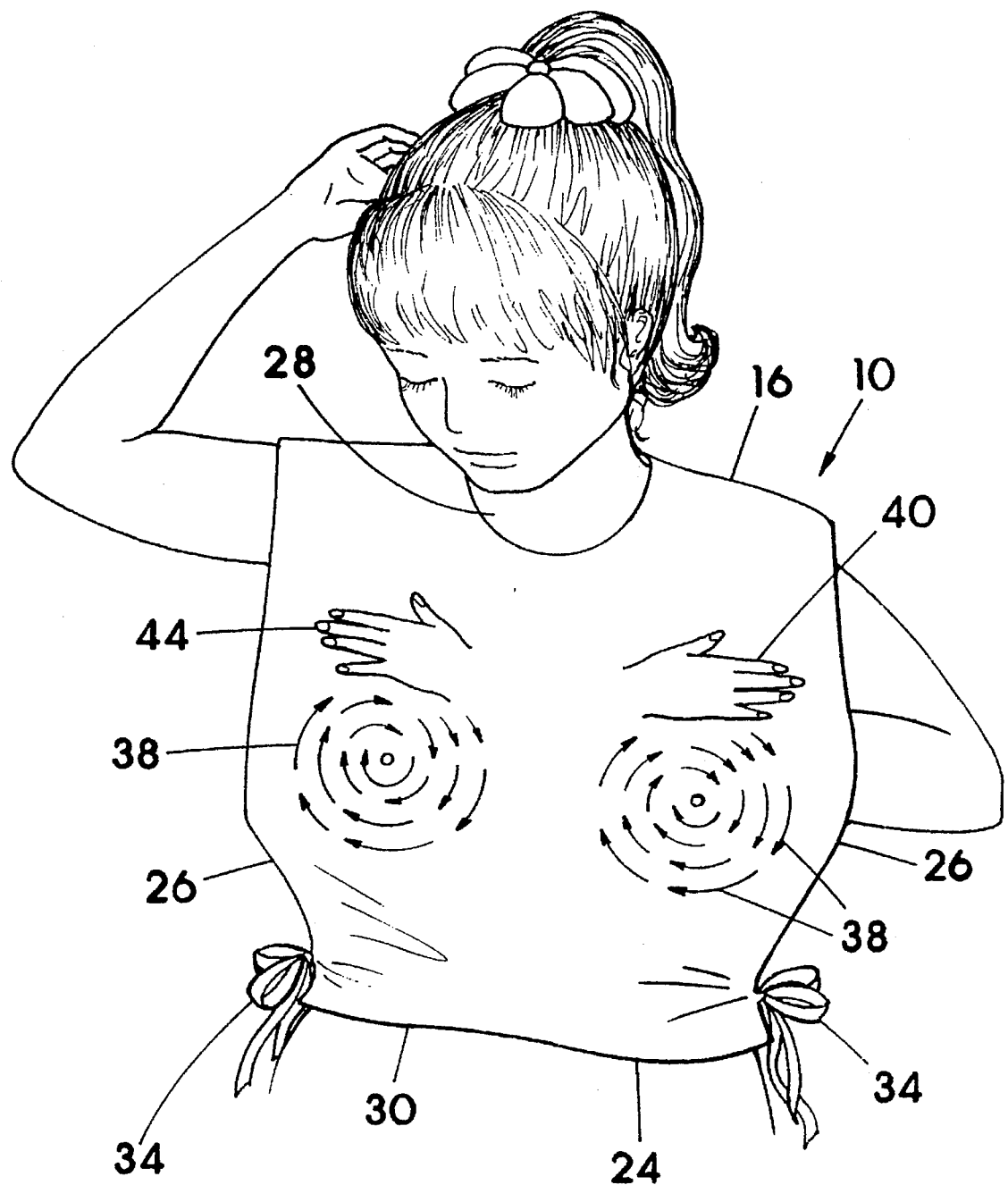
FIG. 8 depicts the instructional garment in use being worn by a woman conducting a self-examination of her breasts.

Since a language barrier may be a problem as some woman have difficulties reading for various reasons, garment 10 may also be provided with only graphic illustrations 40, such as hands 44 and center point 42, along with arrows 38, with printed instructions 36 eliminated, as depicted in FIG. 8. These graphic illustrations 40 are generally universally known and will still provide sufficient information for the women to conduct the examination without the use of printed instructions 36.

It should be understood that the preferred embodiments of the present invention have been disclosed by way of example and that other alterations and modifications may be incorporated without departing from the true scope of invention.

What we claim as our invention:

1. An upper body garment having visible instructions thereon to be worn by a woman for and during breast self-examination and which affords a degree of privacy to the woman by generally covering her breasts while wearing the garment and examining her breasts by directly touching her breasts with her hands underneath said garment, said garment having a front panel and a back panel connected to one another by shoulder seams, one shoulder seam on each side of a central neck opening defined between the front and back panels for passage of a woman's head, said front panel having a left terminal side edge and an oppositely disposed right terminal side edge, said back panel having a left terminal side edge and an oppositely disposed right terminal side edge, first attachment means for releasably connecting the left terminal side edges together for a partial length of the left side edges during wearing of the garment, said first attachment means arranged for connecting the left terminal side edges so as to leave a first side opening between the connected left side edges and above said first attachment means sufficiently large and properly placed to allow insertion of a hand through the first side opening to access a breast while wearing the garment, second attachment means for releasably connecting the right terminal side edges together for a partial length of the right side edges during wearing of the garment, said second attachment means arranged for connecting the right terminal side edges so as to leave a second side opening between the connected right side edges and above said second attachment means sufficiently large and properly placed to allow insertion of a hand through the second side opening to access a breast while wearing the garment, visible instructions imprinted on said front panel, said instructions visible and readable by a woman while wearing the garment so that a woman wearing the garment is capable of reading and following the instructions and accessing her breasts for examination thereof with her hands inserted through said first and second side openings of the garment to directly touch and examine her breasts, said visible instructions including upside-down printed words, and directional arrows indicating proper hand motions in a breast examination.

2. An upper body garment having visible instructions thereon to be worn by a woman for and during breast self-examination, comprising:

said garment including at least a front panel to be worn in the chest area of a woman and sized to generally cover her breasts to afford a degree of privacy, attachment means for releasably connecting the garment to a woman for supporting the front panel over the breasts of the woman, at least one side opening means sufficiently large and properly placed for allowing insertion of a hand underneath the garment to access a breast while wearing the garment over the chest area, visible instructional words imprinted upside-down on said front panel, said instructional words visible and readable by a woman while wearing the garment so that a woman wearing the garment is capable of looking downward toward the garment placed over her breasts and reading the instructional words and accessing her breast for examination thereof with a hand inserted through said at least one side opening means of the garment, directional arrows imprinted on said front panel visible by a woman while wearing the garment, said directional arrows indicating proper hand movement against the breast for self-breast examination.

3. A method of performing a self-breast examination by a woman, comprising the steps of:

(a) the woman removing existing upper body garment(s) so as to be able to put-on an instructional upper body garment which includes printed breast examination instructions indicating how to examine breasts for abnormalities by hand, said instructional upper body garment being of a type having said printed breast examination instructions printed on a front panel of said instructional upper body garment, with said instructional upper body garment further including open means for allowing insertion of a wearer's hands underneath said front panel;

(b) the woman putting said instructional upper body garment on her upper torso so that said front panel is located over her breasts and generally covering her breasts to afford the woman a degree of privacy;

(c) the woman looking downward to read said printed breast examination instructions;

(d) the woman following said printed breast examination instructions and inserting at least one hand at a time underneath said instructional upper body garment to access a breast whereby following said printed breast examination instructions the woman feels her breast for abnormalities.

* * * * *